United States Patent
Kapoor et al.

(10) Patent No.: US 12,554,793 B2
(45) Date of Patent: Feb. 17, 2026

(54) DYNAMIC CONTENT MANAGEMENT SYSTEMS FOR MANAGING AND DEPLOYING DIGITAL CONTENT

(71) Applicant: T-Mobile Innovations LLC, Overland Park, KS (US)

(72) Inventors: Tosh Kapoor, Everett, WA (US); Sanjeet Kumar, Mill Creek, WA (US)

(73) Assignee: T-Mobile Innovations LLC

( * ) Notice: Subject to any disclaimer, the term of this patent is extended or adjusted under 35 U.S.C. 154(b) by 262 days.

(21) Appl. No.: 18/532,927

(22) Filed: Dec. 7, 2023

(65) Prior Publication Data

US 2025/0190512 A1   Jun. 12, 2025

(51) Int. Cl.
  *G06F 17/00* (2019.01)
  *G06F 16/958* (2019.01)
  *H04N 21/858* (2011.01)

(52) U.S. Cl.
  CPC ....... *G06F 16/958* (2019.01); *H04N 21/8586* (2013.01)

(58) Field of Classification Search
  CPC .. G06F 16/958; G06F 16/972; H04N 21/8586
  See application file for complete search history.

(56) References Cited

U.S. PATENT DOCUMENTS

| | | | | |
|---|---|---|---|---|
| 7,523,403 B2* | 4/2009 | Karatal | ................ | G06F 16/958 715/764 |
| 11,206,273 B2* | 12/2021 | Paradis | ................ | H04L 67/568 |
| 2012/0036494 A1* | 2/2012 | Gurumohan | ......... | G06Q 10/103 709/219 |
| 2013/0332817 A1* | 12/2013 | Seifert | .................. | G06F 16/972 715/234 |
| 2014/0250366 A1* | 9/2014 | Bertram | .................. | G06T 11/20 715/234 |
| 2015/0248484 A1* | 9/2015 | Yu | ........................ | G06F 16/9535 707/711 |
| 2017/0068644 A1* | 3/2017 | Jones | .................. | G06Q 30/0277 |
| 2017/0212964 A1* | 7/2017 | D'anna | .................. | G06F 16/986 |
| 2019/0065514 A1* | 2/2019 | Siddiquee | ............... | G06F 16/83 |
| 2019/0132393 A1* | 5/2019 | Ring | .................... | G06F 9/44521 |

(Continued)

FOREIGN PATENT DOCUMENTS

| | | | | |
|---|---|---|---|---|
| CN | 104462114 A | * | 3/2015 | ........... G06F 16/958 |
| CN | 105138698 B | * | 12/2020 | ....... G06F 16/24553 |

(Continued)

*Primary Examiner* — Laurie A Ries

(57) ABSTRACT

A method for managing and deploying digital content using a dynamic content management system executing on a computer system. The method includes receiving or forming digital content created by an author. The method additionally includes storing the one or more view partials in a datastore, and performing a one-time mapping of the one or more view partials to a uniform resource locator (URL) of a webpage using a template associated with the webpage and that identifies one or more components of a tech stack supporting the webpage that facilitate the deploying the template as the webpage. The method further includes embedding the one or more view partials into the template whereby the template structures a presentation of the one or more view partials, and serving in the form of the webpage the embedded template to user equipment of an end user.

20 Claims, 8 Drawing Sheets

(56) References Cited

U.S. PATENT DOCUMENTS

| | | | | |
|---|---|---|---|---|
| 2021/0125606 A1* | 4/2021 | Miller | ............. | H04N 21/47205 |
| 2023/0144009 A1* | 5/2023 | Andersen | ................ | G06F 40/14 |
| | | | | 715/237 |
| 2024/0361883 A1* | 10/2024 | Tamayo | ................ | G06F 40/134 |

FOREIGN PATENT DOCUMENTS

| | | | | | |
|---|---|---|---|---|---|
| CN | 112765522 | A | * | 5/2021 | ........... G06F 16/958 |
| WO | WO-2007104100 | A1 | * | 9/2007 | ........... G06F 16/178 |
| WO | WO-2023063916 | A1 | * | 4/2023 | ........... G06F 16/958 |

\* cited by examiner

DYNAMIC CONTENT MANAGEMENT SYSTEMS FOR MANAGING AND DEPLOYING DIGITAL CONTENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication systems may be utilized to deploy digital content by enterprises and other firms to users via a web page of the given enterprise. For example, the enterprise web page may be hosted on an enterprise server, and may include a large amount of varying types of digital content such as images, text, and other digital content for deploying information to users. This information may take many forms including technical information, product or service descriptions, promotional materials, and the like. Large volumes of digital content forming enterprise web pages may be updated dynamically whereby large numbers of digital content updates are performed daily.

SUMMARY

In an embodiment, a method for managing and deploying digital content using a dynamic content management system executing on a computer system is disclosed. The method includes receiving or forming by a content layer of the dynamic content management system digital content created by an author, and communicating the digital content in the form of one or more view partials to a deployment layer of the dynamic content management system. The method additionally includes storing by the deployment layer the one or more view partials in a datastore, and performing by the deployment layer a one-time mapping of the one or more view partials to a uniform resource locator of a webpage using a template of the deployment layer associated with the webpage and that identifies one or more components of a tech stack supporting the webpage that facilitate the deploying the template as the webpage. The method further includes embedding by the deployment layer the one or more view partials into the template whereby the template structures a presentation of the one or more view partials, and serving in the form of the webpage the embedded template to user equipment of an end user.

In an embodiment, a method for managing and deploying digital content using a dynamic content management system executing on a computer system is disclosed. The method includes receiving or forming by a content layer of the dynamic content management system digital content created by an author, and communicating the digital content in the form of one or more view partials to a deployment layer of the dynamic content management system, wherein the one or more view partials, when communicated to the deployment layer, are not specifically linked to a given webpage. The method additionally includes storing by the deployment layer the one or more view partials in a datastore, and storing by the deployment layer one or more templates in the datastore, wherein each of the one or more templates comprises one or more dynamic fields updatable by a user of the dynamic content management system. The method further includes performing by the deployment layer a one-time mapping of the one or more view partials to a uniform resource locator of a selected webpage using one of the one or more templates whereby the one or more dynamic fields of the template are linked to the one or more view partials, and serving as the selected webpage the embedded template to user equipment of an end user whereby the one or more dynamic fields of the template call for the one or more view partials such that the digital content of the one or more view partials embody the one or more dynamic fields when the template is served as the selected webpage to the user equipment.

In an embodiment, a method for managing and deploying digital content using a dynamic content management system executing on a computer system is disclosed. The method includes receiving or forming by a content layer of the dynamic content management system digital content created by an author, communicating the digital content in the form of one or more view partials to a deployment layer of the dynamic content management system, and storing by the deployment layer the one or more view partials in a datastore. The method additionally includes storing by the deployment layer one or more templates in the datastore, wherein each of the one or more templates comprises both one or more static fields that at least partially define a structure of a given webpage, and one or more dynamic fields updatable by a user of the dynamic content management system, and performing by the deployment layer a one-time mapping of the one or more view partials to a uniform resource locator of a selected webpage using one of the one or more templates whereby the one or more dynamic fields of the template are linked to the one or more view partials. The method further includes synchronously serving a rendered view of the template encompassing both the one or more static fields and the one or more dynamic fields as part of the webpage to user equipment of an end user whereby the one or more dynamic fields of the template call for the one or more view partials such that the digital content of the one or more view partials embody the one or more dynamic fields in the rendered view of the template.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
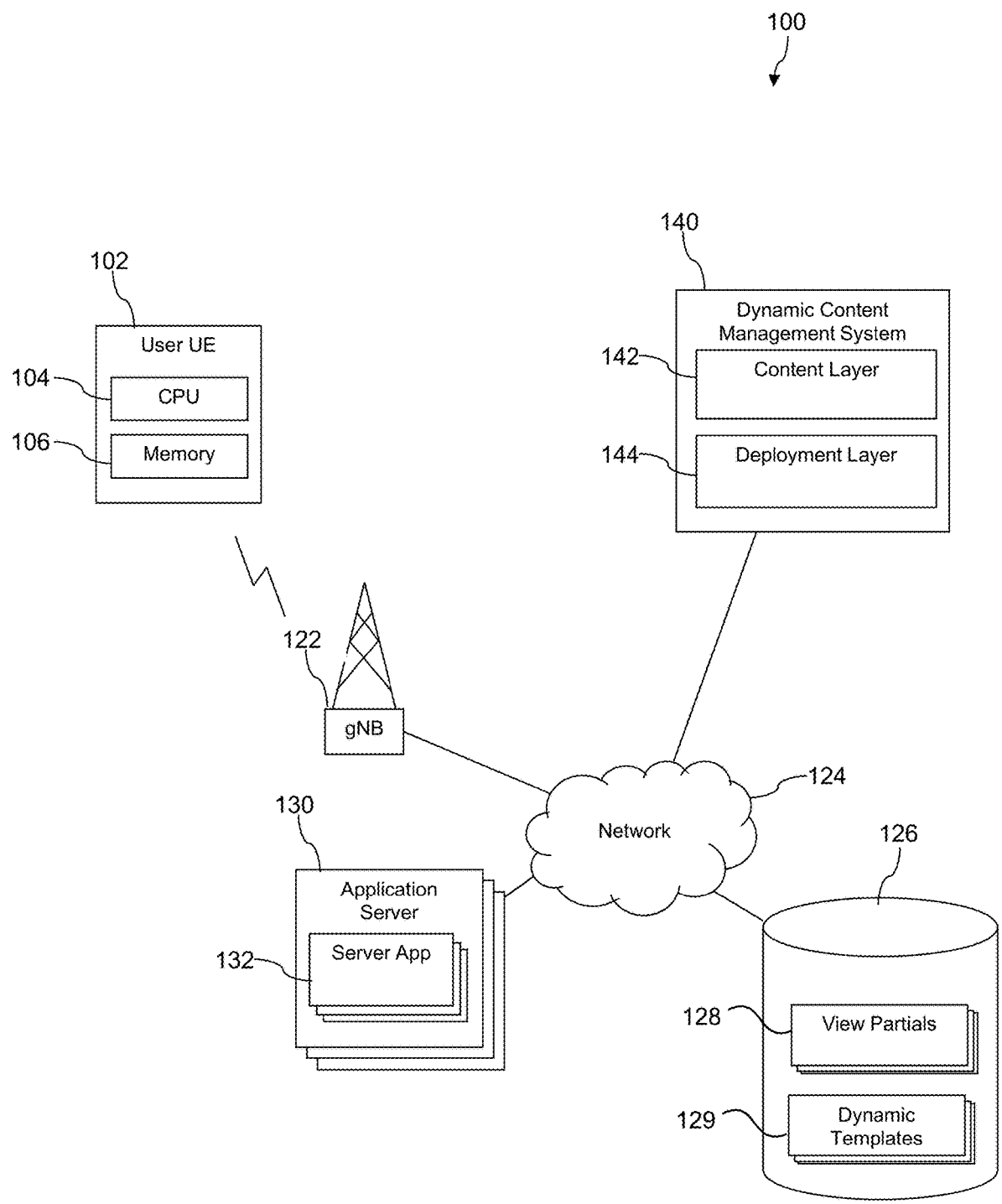
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, in providing information to users, enterprise web pages deliver vast quantities of differing types of digital content that are updated frequently and dynamically. Commonly, enterprises utilize digital content management system (CMS) platforms in the form of software (e.g., executing on one or more enterprise servers) that provide a centralized and structured process for creating, managing, and delivering digital content (e.g., via an enterprise web page, social media, emails) to one or more end users.

Particularly, CMS platforms may include a graphical user interface (GUI) usable by authors of digital content for creating and editing digital content such as through the use of WYSIWYG (What You See Is What You Get) content editors that allow for at least some visual content creation. However, in at least some instances, the complexity of the GUI of a given CMS platform can be a barrier for non-technical content authors, potentially resulting in a steep learning curve and inefficiencies in content creation through lack of familiarity or skill by the content author in operating the GUI.

CMS platforms may additionally facilitate review and approval processes for approving for deployment digital content created by one or more authors using the CMS platform. For example, content typically undergoes review and approval processes involving collaboration among different stakeholders, including content authors, editors, and possibly legal or compliance teams of the enterprise. In addition to facilitating the review and approval process, a CMS platform may additionally automatically facilitate version control and synchronization by managing different versions of content and ensuring synchronization across various channels, devices, and platforms.

CMS platforms typically facilitate the publishing of created and approved digital content to enterprise web pages or other platforms such that the digital content may be deployed to end users. Conventionally, in order to facilitate the deployment of digital content, CMS platforms are directly integrated with the information technology (IT) infrastructure of the given enterprise. While the integration of a given CMS platform with the underlying IT infrastructure (also referred to herein as the "tech stack") may facilitate seamless deployment of digital content to end users in at least some instances, such integration may introduce limitations or issues in the creation, management, and deployment of digital content to end users. For example, while CMS platforms offer user-friendly interfaces for content authors, several limitations arise from their integration with the tech stack, leading to a dependency on IT expertise that can result in the formation of bottlenecks in the process of creating, managing, and deploying digital content shepherded by the given CMS platform.

Integration of CMS platforms with the tech stack may result in dependency on technical expertise that may not be possessed by the authors creating the digital content via a given CMS platform. Particularly, CMS platforms are generally intended to be user-friendly for content authors such that the technical expertise required for operating the CMS is minimized. However, the integration of CMS with the tech stack, including databases, servers, and web frameworks, may require users of the CMS platform (e.g., including content authors in at least some instances) to have a deep understanding of technical aspects of the tech stack. For example, integration may involve configuring the CMS platform to work seamlessly with existing databases, servers, and other components of the tech stack. This may include setting up database connections, configuring server environments, and ensuring compatibility with the organization's specific IT architecture. As a result, individuals without sufficient technical knowledge may struggle with these aspects of integration, leading to a dependency on IT experts having limited bandwidth for addressing issues arising from the operation of the given CMS platform.

In addition, the tech stack of a given enterprise is dynamic and often subject to changes and updates over time. Upgrades, migrations, or the introduction of new technologies can impact the integration of a CMS platform with existing IT systems. In other words, when the tech stack undergoes changes, integration of a CMS platform with the tech stack may be affected. For example, if there is an update to the database management system or a change in the server architecture of the tech stack, configurations within the CMS may need to be adjusted accordingly. Such adjustments require a thorough understanding of both the CMS platform and the tech stack, and failure to do so can lead to compatibility issues, delays in the deployment of digital content (e.g., digital content authored or edited using the CMS platform), and other undesirable issues.

Additionally, the adoption of a given CMS platform may tie resources of the enterprise to a given technology undergirding the CMS platform. For example, a given CMS platform may be built on a JavaScript-based programming infrastructure, requiring a sufficient level of expertise in JavaScript within the enterprise in order to properly maintain and operate the CMS platform. However, should the enterprise wish to modify or replace the CMS platform, this specific expertise may become outmoded while expertise pertaining to a different technology may be required (and which may not be already present within the enterprise) to effectuate such a modification or replacement of the CMS platform. In some instances, new personnel may need to be added to the enterprise in order to augment the enterprise's expertise with respect to a given technology in order to effectuate the modification or replacement of the CMS platform, thereby undesirably delaying the desired implementation of the modification or replacement.

Additionally, CMS platforms often regularly release updates and new versions to introduce features, security enhancements, bug fixes, and other features. However, these updates may introduce changes that affect the existing integration with the underlying IT architecture. For example, the valuable attention of the enterprise's IT experts may be required to ensure that the CMS platform remains compatible with the updated or new versions of the tech stack. This process may involve testing the CMS-IT integration, modifying configurations, and potentially updating custom code or scripts that facilitate the connection between the CMS platform and other IT components. The lack of technical expertise in navigating these changes can lead to delays in updating the CMS platform and, subsequently, delays in the timely deployment of digital content to end users.

Further, organizations often require customizations and extensions to CMS functionality to meet specific business requirements. Achieving these customizations involves technical expertise. Particularly, customizing a given CMS platform for needs unique to a given enterprise may require writing custom code, developing plugins, and/or integrating third-party solutions. Individuals without technical expertise may find it challenging to implement these customizations or troubleshoot issues that arise during the customization process. This resulting reliance on the enterprise's IT experts can result in bottlenecks, especially when rapid adjustments are necessary for changing requirements of the given enterprise.

Finally, ensuring the security of the integrated CMS platform is crucial, and may require a comprehensive understanding of both security features of the CMS platform and the organization's overall security policies. The enterprise's IT experts may thus be responsible for configuring security settings, implementing encryption, managing user access controls, and ensuring that the CMS platform complies with security best practices. Without adequate technical knowledge, there is a risk of misconfigurations that could compromise the integrity and confidentiality of the content, leading to potential security vulnerabilities.

In summary, the integration of CMS platforms with a tech stack introduces complexities that often require a level of technical expertise when operating the given CMS platform. In turn, dependency on IT expertise can result in bottlenecks in the process of creating, managing, and deploying digital content to end users facilitated by the CMS platform. For example, such bottlenecks may occur when changes occur in the tech stack, updates are released for the CMS platform and/or the tech stack, or when customizations are required. Addressing these limitations requires a strategic approach to training content creators (a costly and cumbersome undertaking) or providing user-friendly tools that abstract the technical intricacies of integration.

Accordingly, embodiments of dynamic content management systems for managing and deploying digital content disclosed herein sever the direct relationship between the content management system and the tech stack. Particularly, embodiments of dynamic content management systems described herein include a content layer and a separate deployment layer. The content layer interfaces (e.g., via a user interface) with users of the dynamic content management system such as authors of digital content, approvers for reviewing digital content prior to deployment, and the like. The users that interface with the content layer may be a non-technical person lacking in the expertise required to work on the tech stack. In other words, their roles within a given enterprise may not necessarily focus on technical matters related to the tech stack and instead their expertise may lie elsewhere within the realm of content management.

The deployment layer of the dynamic content management system serves as an intermediate layer or buffer between the content layer and the tech stack whereby the content layer need not be inextricably bound up or linked with the existing tech stack where instead the relationship between the content layer and the tech stack is mediated by and through the intervening deployment layer. In this manner, the content layer becomes "headless" in the sense that it may operate (and users may interface with it) irrespective of the configuration of the tech stack. In a sense, the intervening deployment layer masks the tech stack from the content layer such that the content layer may be indifferent to the configuration of the tech stack.

To provide an example, an instance of a given conventional content management systems manifest as a deployable artifact of a webpage supported by the content management system. In this manner, the content management system, through its instantiation as a deployable artifact of the webpage, is directly linked and dependent on the tech stack undergirding the webpage. In this example, certain changes to the tech stack (e.g., in an effort to augment the performance of the tech stack) may require corresponding changes to the conventional content management system (e.g., needing to replace certain templates or other objects of the content management system).

For instance, templates utilized by the conventional content management system may need to be replaced to allow the content deployed by the content management system to properly interface with webpages supported by the tech stack. In some instances, each webpage may have its own unique template developed by technicians and other technical staff responsible for operating and maintaining the underlying tech stack. The templates of given webpages may include or embody webservices such as JavaScript-based webservices like Representational State Transfer (REST) webservices (sometimes referred to as "RESTful webservices"). Alternatively, the templates of given webpages may include or embody webservices such as Extensible Markup Language (XML) webservices like Remote Procedure Call (XML-RPC), Universal Description, Discovery, and Integration (UDDI), and SOAP. Given that the templates are tied to particular webservices, changes to the tech stack that result in changes to the existing webservices utilized by certain webpages may require similar changes to be made to the conventional content management system that is similarly reliant on the given existing webservice.

These different webservices may provide their own unique application programming interfaces (APIs) each defining a unique set of commands and functions for transmitting information. For instance, JavaScript-based webservices like REST utilize JavaScript Object Notation (JSON) data format for storing and transporting information in a standardized manner specific to the JSON data format. Alternatively, instead of utilizing the JSON data format, XML may be utilized for storing and transporting information in a standardized manner unique to XML and different from the manner in which data is transported using the JSON data format.

Converse to the example of conventional content management systems provided above, the content layer of the dynamic content management system is not a deployable artifact of webpages supported by the dynamic content management system. Particularly, the content layer is configured to output or publish information (e.g., following authoring and approval facilitated by the content management system) in the form of "view partials" or "partial pages" that are not deployed to the end users as an artifact of a webpage loaded by the end user. The view partials published by the content layer are not in the form of artifacts deployable on webpages, and instead are deployed to the deployment layer. For example, a plurality of view partials corresponding to a given webpage may be stored together in a folder (e.g., a network folder) accessible by the deployment layer. In some embodiments, the view partials are stored as content files in a datastore of a communication system.

The deployment layer of the dynamic content management system (and which may be connected to the content layer across a network of a communication system), provides a dynamic template that defines the connection between the content layer and the tech stack whereby digital content published by the content layer (e.g., in the form of view partials) may be served to an end user. For example, the dynamic template provided by the deployment layer may include or embody one or more webservices to facilitate the delivery of the digital content to the end user.

In some embodiments, unlike conventional content management systems having hardwired dynamic templates that are difficult and costly to change, the dynamic template provided by the deployment layer performs a one-time mapping between the digital content provided by the content layer (e.g., in the form of a collection of view partials) and a selected webpage for which it is desired to serve the digital content. The one-time mapping performed by the dynamic template maps selected view partials produced by the content layer with the Uniform Resource Locators (URLs) of a selected website. In this manner, the dynamic template receives the collection of view partials as input, operates upon the received view partials (e.g., as part of performing the one-time mapping) to produce a webpage including or embodying the digital content of the view partials which may be served to end users through the webpage. In performing the one-time mapping, the dynamic template connects the view partials to the necessary features of the tech stack (e.g., specific webservices such as NorJS services) required to deploy the view partials to a given webpage. In addition, the one-time mapping performed by the dynamic template (e.g., in "calling up" required features of the tech stack) structures the view partials in a manner that makes them servable to an end user as part of a webpage. In other words, the view partials "fill in" the dynamic template which may then be served (as part of the one-time mapping) as a webpage to an end user.

Unlike the dynamic templates utilized by conventional content management systems that are fixed or hardwired and thus difficult and costly to change, the dynamic template of the deployment layer is quickly and easily reconfigurable between different one-time mappings performed by the deployment layer. For instance, a first one-time mapping between a first set of view partials and a first webpage may vary in manner or configuration (e.g., in the configuration or type of webservices defining the mapping) from a second one-time mapping performed by the deployment layer between a second set of view partials (different from the first set) and a second webpage (different from the first webpage).

The static templates of conventional content management systems generally do not map the digital content directly to the webpage URL (e.g., the URL visible to the end user) and instead map the digital content to specific components of the tech stack used to deploy the given digital content, thereby directly linking the digital content to specific features or components of the tech stack. Conversely, the partial views published by the content layer of the dynamic content management system are one-time mapped by the dynamic template of the deployment layer to the webpage URL itself and not to specific features of the tech stack, thereby facilitating the de-linking of the direct linkage between the digital content (in the form of the view partials) from the tech stack.

In some embodiments, dynamic templates of the deployment layer are initially created by technical personnel (e.g., personnel familiar with the workings of the tech stack) of an enterprise separately from the creation of digital content (e.g., facilitated by the content layer) by authors who are not themselves technicians familiar with the workings of the tech stack. The dynamic templates are essentially left blank of the digital content published by the content layer and instead are embedded with services or functions (e.g., webservices) that call for specific view partials published by the content layer when the dynamic content management system is ready to publish the view partials as part of a webpage embodying the now filled-in dynamic template. In this manner, the dynamic templates of the deployment layer are dynamic in that they are not statically linked with specific digital content and instead may be filled-in by a different digital content depending on the identity of the given webpage the dynamic content management system wishes to serve.

The dynamic templates of the deployment layer may include one or more fields each containing information in the form of content, instructions (e.g., for invoking a webservice or other component of the tech stack), and other information. Particularly, in some embodiments, the dynamic templates include both one or more static fields and one or more dynamic fields. The one or more static fields of a given dynamic template at least partially define the structure of a webpage associated with the dynamic template. For example, the one or more static fields may define how digital content is to be presented on the webpage, how the webpage links with other web-deliverable content, and may define one or more interfaces between the webpage and the underlying tech stack. The one or more static fields are "static" in that they define the structure of the dynamic template and thus changes to the one or more static fields may result in the overall modification of the dynamic template. Conversely, the one or more dynamic fields of a given dynamic template are instead able to be quickly and conveniently updated without necessarily modifying the structure of the dynamic template itself.

In some embodiments, the deployment layer is configured to synchronously serve a rendered view of the dynamic template and may be embedded with one or more services or functions (e.g., one or more webservices) configured to call for selected view partials published by the content layer. In other words, the dynamic fields are initially empty of view partials (e.g., in an unfilled state of the one or more dynamic fields) and only through the invoking of services embedded in the dynamic fields may the dynamic fields be filled with selected view partials (e.g., in a filled state of the one or more dynamic fields). The specific view partials called up by the one or more dynamic fields when the one-time mapping of the dynamic template is performed may be quickly and conveniently updated by users of the dynamic content management system.

Thus, instead of modifying the structure of the template itself by replacing particular digital content statically linked to the template with other digital content, the one or more dynamic fields of a given dynamic template may be instructed to call up different view partials without needing to modify any of the one or more static fields of the dynamic template. In addition, rather than serving the digital content asynchronously with other features of the template (e.g., structural features of the template) as is typically the case with conventional content management systems, both the one or more static fields and the one or more dynamic fields of a given dynamic template may be delivered concurrently or synchronously as a complete rendered view of the webpage. The synchronous deployment of the completed rendered view of the webpage (rather than asynchronous deployment and updating as with conventional content management systems) may enhance the computational and network efficiency of a communication system comprising the dynamic content management system.

Turning to FIG. 1, a communication system 100 is described. In an embodiment, the communication system 100 generally includes a user electronic device (user equipment—UE) 102, an access node 122, a network 124, a datastore 126, an application server 130, and a dynamic content management system 140. It may be understood that in at least some embodiments the dynamic content management system 140 is implemented as one or more software applications executing on a computer system. UE 102 may comprise, for example, a desktop computer, a workstation, a laptop computer, a tablet computer, a smartphone, a wearable computer, an internet of things (IoT) device, and/or a notebook computer. UE 102 may be operated by a user or customer of the network 124 such as an enterprise, organization, or individual.

The access node 122 of communication system 100 may provide communication coupling the UE 102 to the network 124 according to a 5G protocol, for example 5G, 5G New Radio, or 5G LTE radio communication protocols. The access node 122 may provide communication coupling the UE 102 to the network 124 according to a long term evolution (LTE), a code division multiple access (CDMA), and/or a global system for mobile communication (GSM) radio communication protocol. The access node 122 may be referred to for some contexts as a gigabit Node B (gNB), an enhanced Node B (eNB), a cell site, or a cell tower. Additionally, while not shown, UE 102 may be communicatively coupled to the network 124 via a WiFi access point or another non-cellular radio device. Further, while a single access node 122 is illustrated in FIG. 1, it is understood that communication system 100 may comprise any number of access nodes 122.

The network 124 of communication system 100 may comprise one or more public networks, one or more private networks, or a combination thereof. For example, network 124 may comprise a core network, such as a 5G core network. Further details of 5G networks are discussed below with reference to FIGS. 6A, 6B. While shown as communicatively coupled to the network 124, datastore 126, application server 130, and dynamic content management system 140 may be considered part of network 124 and are illustrated as separate from network 124 in FIG. 1 to promote discussing their roles with respect to UE 102, as will be discussed further herein. Additionally, although in FIG. 1 network 124 is shown as including only a single datastore 126 and application server 130, it may be understood that network 124 may include varying numbers of datastores and servers.

UE 102 includes a processor or CPU 104 and a memory 106 in signal communication with the processor 104. UE 102 may access various resources of network 124 through the access node 122. For example, users of UE 102 may transmit information from UE 102 to the network 124 through the access node 122 and save the transmitted information on the network 124, such as on datastore 126. In addition, UE 102 may access at least some of the resources of the application server 130, where application server 130 may include one or more server applications 132. Server applications 132 may provide one or more services or features accessible by the user through UE 102.

The datastore 126 of communication system 100 includes a plurality of view partials 128 each comprising digital content created by one or more authors. In some embodiments, the view partials 128 comprise partial renderings of one or more webpages—"partial" in the sense that view partials 128 themselves do not comprise content servable as a webpage and instead must be embedded in a renderable template before being published as a webpage to one or more end users.

In addition to view partials 128, in this exemplary embodiment, datastore 126 includes a plurality of dynamic templates 129. As will be described further herein, view partials 128 are embeddable in the dynamic templates 129 whereby the embedded dynamic templates 129 may be rendered as a webpage to one or more users. Dynamic templates 129 may include one or more static fields structuring the dynamic templates 129 and one or more dynamic fields that may be filled by the view partials 128. For instance, the dynamic fields may comprise services (e.g., webservices) configured to call for selected view partials 128 to fill the initially vacant dynamic fields with the digital content defining the selected view partials 128.

The dynamic content management system 140 of communication system 100 is generally configured to facilitate the management and deployment of digital content to end users such as the UE 102 of an end user. In this exemplary embodiment, dynamic content management system 140 generally includes a content layer 142 and a separate and distinct deployment layer 144. The content layer 142 of dynamic content management system 140 facilitates the creation and/or publishing of the view partials 128 stored in the datastore 126. Particularly, the view partials 128 are formed by digital content such as images, animations, videos, text, composite content including both images, text, etc., and other visually perceptible (e.g., by an end user) content.

In some embodiments, content layer 142 includes a GUI usable by authors and other users for creating, reviewing, editing, and/or managing digital content. The users of content layer 142 may differ from the end users ultimately served the digital content embodying view partials 128 as part of a webpage. For example, the users of content layer 142 may comprise employees of an enterprise operating the dynamic content management system 140 and/or vendors performing work on the behalf of the enterprise. These enterprise users may initially create the digital content, edit the content, and approve the content for publishing to end users. In some embodiments, content layer 142 comprises one or more content editors such as WYSIWYG content editors to facilitate visual content creation. In addition, in some embodiments, content layer 142 comprises approval management modules or engines for facilitating the review and approval of digital content (e.g., by one or more approvers) for publishing to end users.

The deployment layer 144 of dynamic content management system 140 is generally configured to serve the view partials 128 published by content layer 142 as webpages. Particularly, deployment layer 144 places the view partials 128 in a renderable structure that may be deployed or served to one or more end users as a webpage where, as described above, the view partials 128 themselves do not comprise deployable artifacts of a webpage. The renderable structure providable by deployment layer 144 is in the form of dynamic templates 129. In some embodiments, deployment layer 144 may store and retrieve the view partials 128 and dynamic templates 129 from the datastore 126. In other embodiments, other components of communication system 100 may store and/or retrieve view partials 128 and/or dynamic templates 129 from datastore 126.

Each of the dynamic templates 129 may be linked to or associated with a specific webpage. Particularly, dynamic templates 129 may provide vehicles for the serving of the digital content embodying view partials 128 to end users as one or more webpages. In this manner, dynamic templates 129 structure the view partials 128 as deployable artifacts. Additionally, dynamic templates 129 are dynamic in that they may be used in conjunction with a variety of different view partials 128. In other words, dynamic templates 129 are not statically linked to specific view partials 128, and instead, different view partials 128 may be loaded or embedded in a given dynamic template 129 at different points in time. In this manner, view partials 128 may be conveniently and quickly embedded in the dynamic templates 129 as desired by users of the dynamic content management system 140. For example, at one point in time a first "one-time" mapping may be performed using a first dynamic template 129 whereby a first collection of view partials 128 are embedded in the first dynamic template 129 and served as a webpage to one or more end users. Then, at a second point in time, a second one-time mapping may be performed using the first dynamic template 129 whereby a second collection of view partials 128 (different from the first collection) are embedded in the first dynamic template 129 and served as a webpage to one or more end users.

Figure 2:
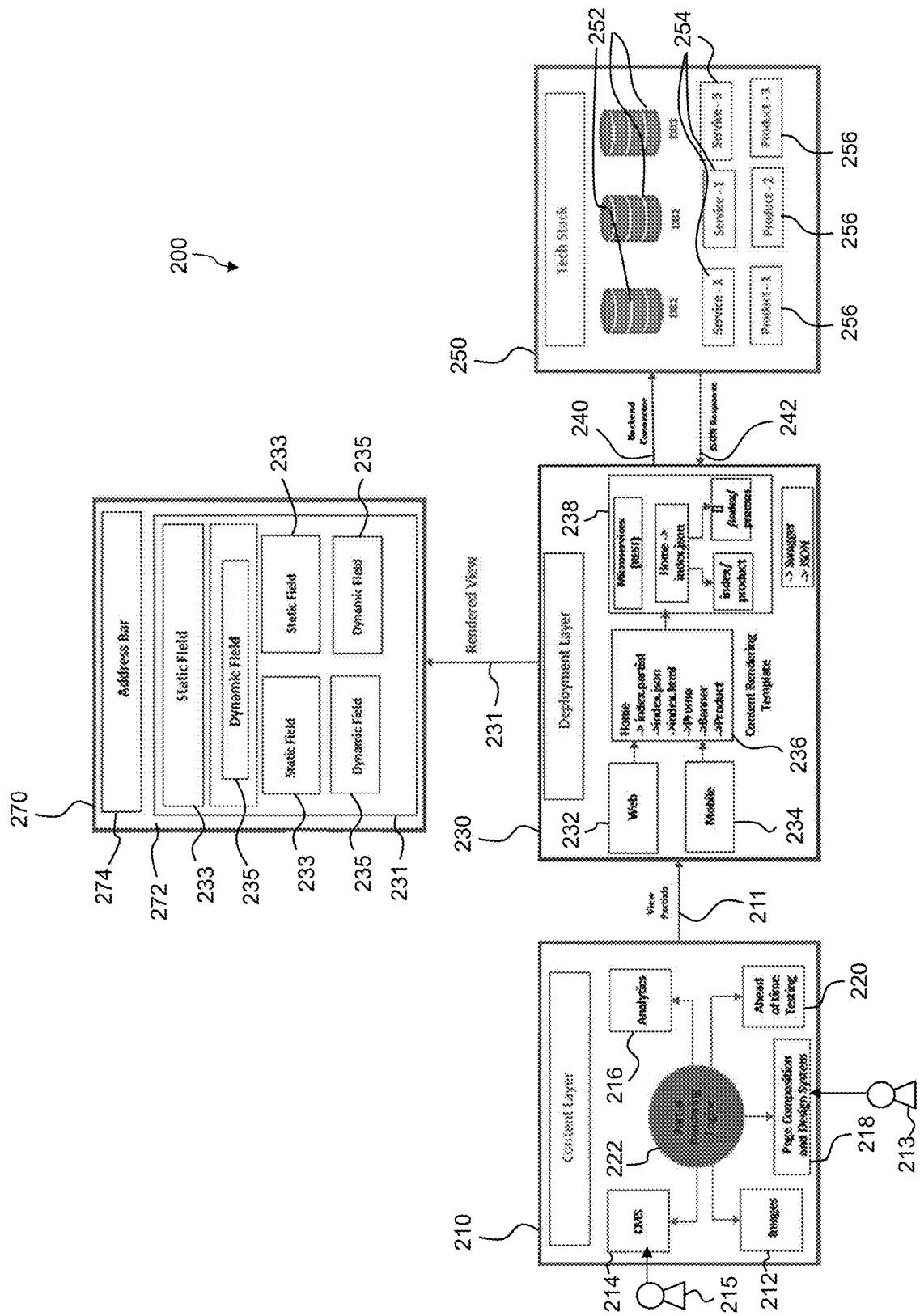
FIG. 2 is a block diagram of a dynamic content management system according to an embodiment of the disclosure.

Referring now to FIG. 2, a block diagram of an exemplary dynamic content management system 200 is shown according to some embodiments. In some embodiments, the dynamic content management system 140 illustrated in FIG. 1 may comprise the dynamic content management system 200 described further below. However, in other embodiments, the configuration of dynamic content management system 140 may vary from the configuration of dynamic content management system 200.

In this exemplary embodiment, dynamic content management system 200 generally includes a content layer 210 and a deployment layer 230 in signal communication with the content layer 210. In addition, FIG. 2 illustrates an exemplary tech stack 250 in signal communication with deployment layer 230, and UE 270 also in signal communication with deployment layer 230. Tech stack 250 and UE 270 are not strictly components of the dynamic content management system 200, but are also shown in FIG. 2 for convenience in describing content layer 210 and deployment layer 230.

The content layer 210 of the dynamic content management system 200 produces one or more view partials 211 (which may be similar in configuration to the view partials 128 shown in FIG. 1) and to communicate or publish the one or more view partials 211 to the deployment layer 230. In this exemplary embodiment, content layer 210 generally includes images 212, a content manager 214 for managing digital content created using content layer 210, an analytics engine 216, a page composition and design system 218 (also referred to herein as preview system 218), a testing module 220, and a partial rendering engine 222. Page composition and design system 218 may comprise a content editor including a GUI to allow one or more authors 213 to author different pieces of digital content such as graphically using a WYSIWYG technique or process. The content manager 214 may facilitate the process of approving (e.g., by an approver 215) digital content created using the page composition and design system 218 for publishing as view partials 211.

Additionally, the analytics engine 216 of content layer 210 may be used to capture behaviors of end users to provide insights to authors 213 of digital content. For example, analytics engine 216 may capture behavior of end users visiting webpages rendered using the dynamic content management system 200. The testing module 220 of content layer 210 permits authors 213 to preview the rendering of their authored digital content in different page formats. For example, it may permit authors 213 to view their authored digital content in a web format such as page formats used to present webpages on laptop or desktop computers, tablets, and the like. Additionally, testing module 220 may permit authors 213 to preview their authored digital content in a mobile format used to present webpages on smartphones and the like. The suitability of given digital content may depend on the page format in which it is presented, and page composition and design system 218 may permit authors 213 to check their work in one or more different intended page formats.

The partial rendering engine 222 of content layer 210 takes the digital content authored using page composition and design system 218 and partially renders or publishes the digital content, once approved by an approver 215 in at least some instances, as view partials 211. The partial rendering engine 222 interfaces with each of the features 212, 214, 216, 218, and 220 of content layer 210 and provides the underlying infrastructure of the content layer 210 and typically does not change over time even as changes may be made to the tech stack 250.

The deployment layer 230 of dynamic content management system 200 is configured to produce and deploy one or more rendered views or webpages 231 to UE 270 of an end user. In this exemplary embodiment, deployment layer 230 generally includes a web module 232, a mobile module 234, a template rendering engine 236, and a service module 238. The web and mobile modules 232 and 234 may contain information pertaining to different web and mobile page formats 234 that may be used by the template rendering engine 236 for creating one or more dynamic templates.

The template rendering engine 236 of deployment layer 230, based on information provided by web and/or mobile modules 232 and 234, respectively, is generally configured to render or generate one or more dynamic templates (e.g., dynamic templates 129). As described above, the dynamic templates structure the rendered webpages 231 produced by deployment layer 230 and are selectably embeddable (e.g., via a call made by a webservice) with the view partials 211 published by content layer 210. For example, it may define the spatial location or placement of different view partials 211 in the rendered webpage 231 along with other underlying structure not visible to the end user.

The service module 238 assists the template rendering engine 236 in creating one or more digital templates. Particularly, service module 238 includes one or more services such as webservices like the RESTful webservices. The services of service module 238 may facilitate communication between template rendering engine 236 and the tech stack 250. For example, services of service module 238 may make appropriate calls for different resources of the tech stack 250 as needed by template rendering engine 236 in creating a given dynamic template.

The content layer 210 of dynamic content management system 200 is not directly connected to the tech stack 250 and instead is connected to the tech stack 250 through the intervening deployment layer 230. Particularly, in this exemplary embodiment, deployment layer 230 is connected to tech stack 250 via a backend connector 240. In some embodiments, the backend connector 240 maps out a plurality of separate scenarios which may be used to condition or structure communication from the deployment layer 230 to the tech stack 250. These different scenarios may correspond to different dynamic features or components of a given rendered webpage 231.

Additionally, these different scenarios may define the different ways in which an end user may interact with a given rendered webpage 231. For example, the scenarios defined by backend connector 240 may include a product scenario, a promotional scenario, a checkout scenario, a search scenario, and so on and so forth. Thus, the scenarios may pertain to different topics and/or different manners in which an end user may interact with a given rendered webpage 231. In this exemplary embodiment, information may be returned to the deployment layer 230 from the tech stack 250 (e.g., following invoking a given scenario of the backend connector 240) via a response connector 242 which may comprise a JSON response (e.g., the returned data may be structured in accordance with the JSON data format) in some embodiments.

The tech stack 250 provides the underlying infrastructure for serving rendered webpages 231 to UE 270 of different users. In this exemplary embodiment, tech stack 250 includes a plurality of datastores 252, a plurality of services (e.g., webservices) 254, and a plurality of products 256. Services 254 and/or products 256 may be configured to retrieve information from or store information in the datastores 252. In some embodiments, datastores 252 may store the view partials 211 published by content layer 210. In certain embodiments, a plurality of different dynamic templates are stored in the template rendering engine 236 (e.g., the engine 236 may comprise its own datastore) which may manage the stored dynamic templates. In other embodiments, dynamic templates created by template rendering engine 236 are stored in datastores 252 of tech stack 250.

Each of features 252, 254, and 256 may be utilized by the template rendering engine 236 in creating one or more dynamic templates. For example, the different scenarios defined by the backend connector 240 may correspond to or be mapped with selected services 254 and/or one or more selected products 256 of tech stack 250 for executing or implementing the given scenarios as part of a rendered webpage 231. Information obtained from the selected services 254 and/or products 256 may be returned to the deployment layer 230 via the response connector 240. For example, in response to the action of an end user of UE 270 (e.g., requesting a homepage using their browser), the template rendering engine 236 may invoke the appropriate scenario from backend connector 240, causing the backend connector 240 to invoke selected resources of tech stack 250 mapped to the given scenario and which may be returned to the template rendering engine 236 via response connector 242 whereby the template rendering engine 236 may render an appropriate dynamic template as a rendered webpage 231 (e.g., the requested homepage).

In addition, deployment layer 230 may utilize the resources provided by tech stack 250 irrespective of the type of underlying technology (e.g., a JavaScript-based technology, a Python-based technology) with which the tech stack 250 is built. In other words, deployment layer 230 is generally indifferent as to the type of technology with which the tech stack 250 is constructed. Modifications to the tech stack 250 (e.g., modifications, deletions, and/or additions of components 252, 254, and/or 256) may require corresponding modifications to the scenarios defined by backend connector 240 (e.g., remapping the scenarios to the modified components 252, 254, and/or 256). However, corresponding modifications are not required to the content layer 210 (e.g., to the partial rendering engine 222).

In some embodiments, the operation of template rendering engine 236 may depend on whether a rendered webpage 231 requested by an end user has been previously visited by the end user. For example, if a requested rendered webpage 231 has been previously visited by the user, then the rendered webpage 231 may be cached or stored in memory (e.g., within datastores 252). The cache of the rendered webpage 231 may be stored for a predefined storage duration unless a modification has occurred to the view partials 211 associated with the given rendered webpage 231, at which point the cache may be deleted. In addition, the deployment layer 230 may regenerate the given rendered webpage 231 in response to the deletion of the cache of the rendered webpage 231 (e.g., resulting from the exhaustion of the predefined storage duration for the webpage 231).

In this exemplary embodiment, UE 270 displays an exemplary rendered view or webpage 231 on a UI 272 of UE 270 where the rendered webpage 231 is servable from or by the dynamic content management system 200. The rendered webpage 231 is identified by a URL 274. In this exemplary embodiment, rendered webpage 231 is rendered by the deployment layer 230 from one of the dynamic templates (e.g., one of dynamic templates 129 shown in FIG. 1) mapped to the URL 274 and includes a plurality of static fields 233 and a plurality of dynamic fields 235. The content of static fields 233 of rendered webpage 231 may be hardwired to the corresponding dynamic template such that modifying any of the static fields 233 indefinitely reconfigures or restructures the dynamic template. In other words, static fields 233 structure the dynamic template and the corresponding webpage 231 rendered therefrom.

The dynamic fields 235 of rendered webpage 231 are configured to contain or be filled with digital content such as the digital content embodying view partials 211. In addition, the dynamic fields 235 are dynamic such that initially the dynamic fields 235 of the corresponding dynamic template are initially empty of view partials 211, and only after services embedded in the dynamic fields 235 are invoked are selected view partials 211 imported or embedded in the dynamic fields 235 whereby the dynamic template may be served to an end user in the form of rendered webpage 231. Additionally, in some embodiments, the entire rendered webpage 231 is served synchronously such that both the plurality of static fields 233 and plurality of dynamic fields 235 are served in concert.

Figure 3:
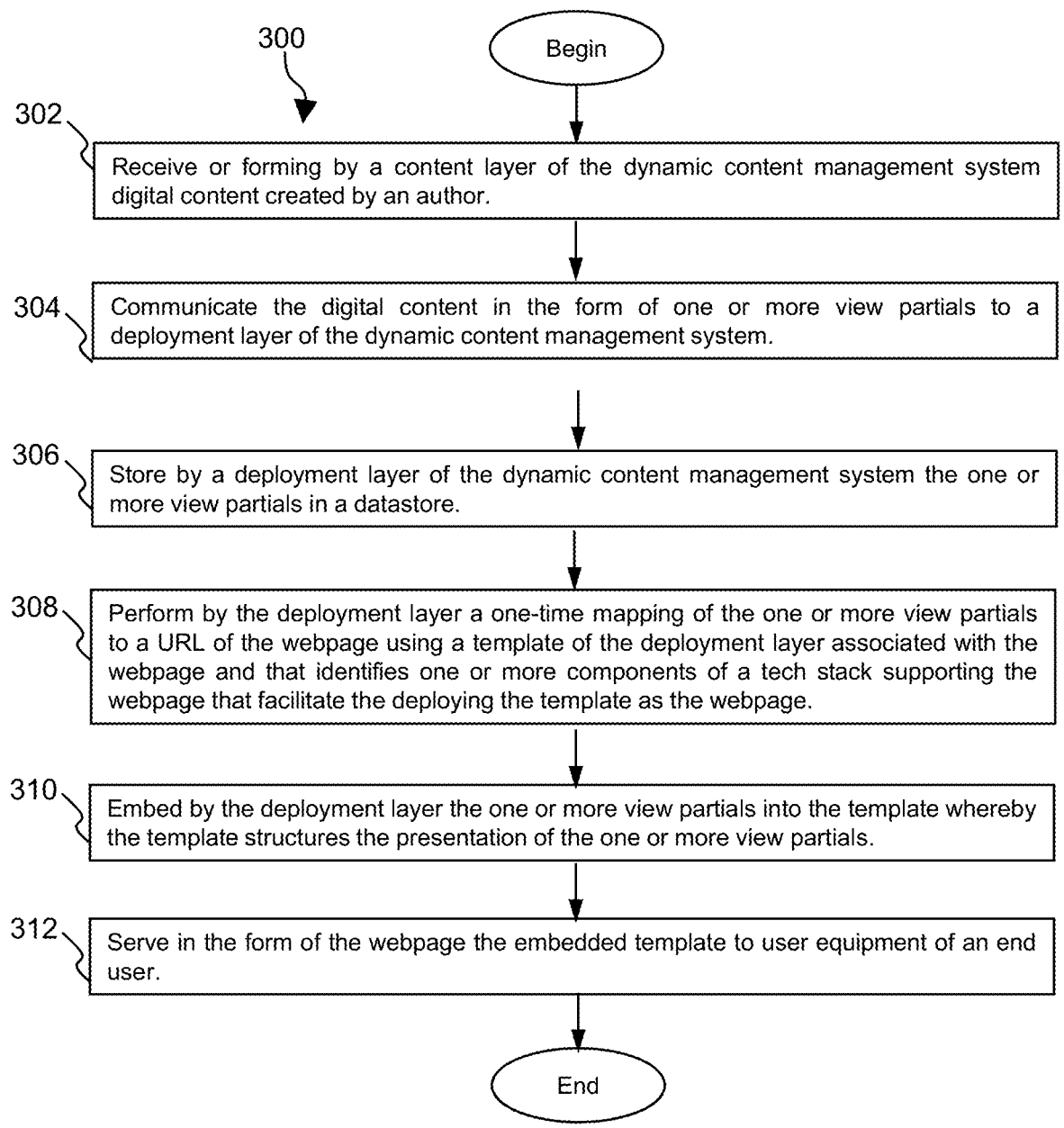
FIG. 3 is a flow chart of a method for managing and deploying digital content using a dynamic content management system according to an embodiment of the disclosure.

Turning to FIG. 3, a method 300 is described. In an embodiment, the method 300 is a method for managing and deploying digital content using a dynamic content management system (e.g., dynamic content management systems 140 and 200 illustrated in FIGS. 1 and 2, respectively). At block 302, method 300 comprises receiving or forming by a content layer (e.g., content layers 142 and 210 illustrated in FIGS. 1 and 2, respectively) of the dynamic content management system digital content created by an author (e.g., author 213 illustrated in FIG. 2).

At block 304, method 300 comprises communicating the digital content in the form of one or more view partials (e.g., view partials 128 and 211 illustrated in FIGS. 1 and 2, respectively) to a deployment layer (e.g., deployment layers 144 and 230 illustrated in FIGS. 1 and 2, respectively) of the dynamic content management system. At block 306, method 300 comprises storing by the deployment layer the one or more view partials in a datastore (e.g., a datastore of the template rendering engine 236 illustrated in FIG. 2).

At block 308, method 300 comprises performing by the deployment layer a one-time mapping of the one or more view partials to a URL of the webpage using a template (e.g., dynamic templates 129) of the deployment layer associated with the webpage and that identifies one or more components of a tech stack (e.g., tech stack 250 illustrated in FIG. 2) supporting the webpage that facilitate the deploying the template as the webpage. At block 310, method 300 comprises embedding by the deployment layer the one or more view partials into the template whereby the template structures the presentation of the one or more view partials. At block 312, method 300 comprises serving in the form of the webpage the embedded template to user equipment of an end user.

Figure 4:
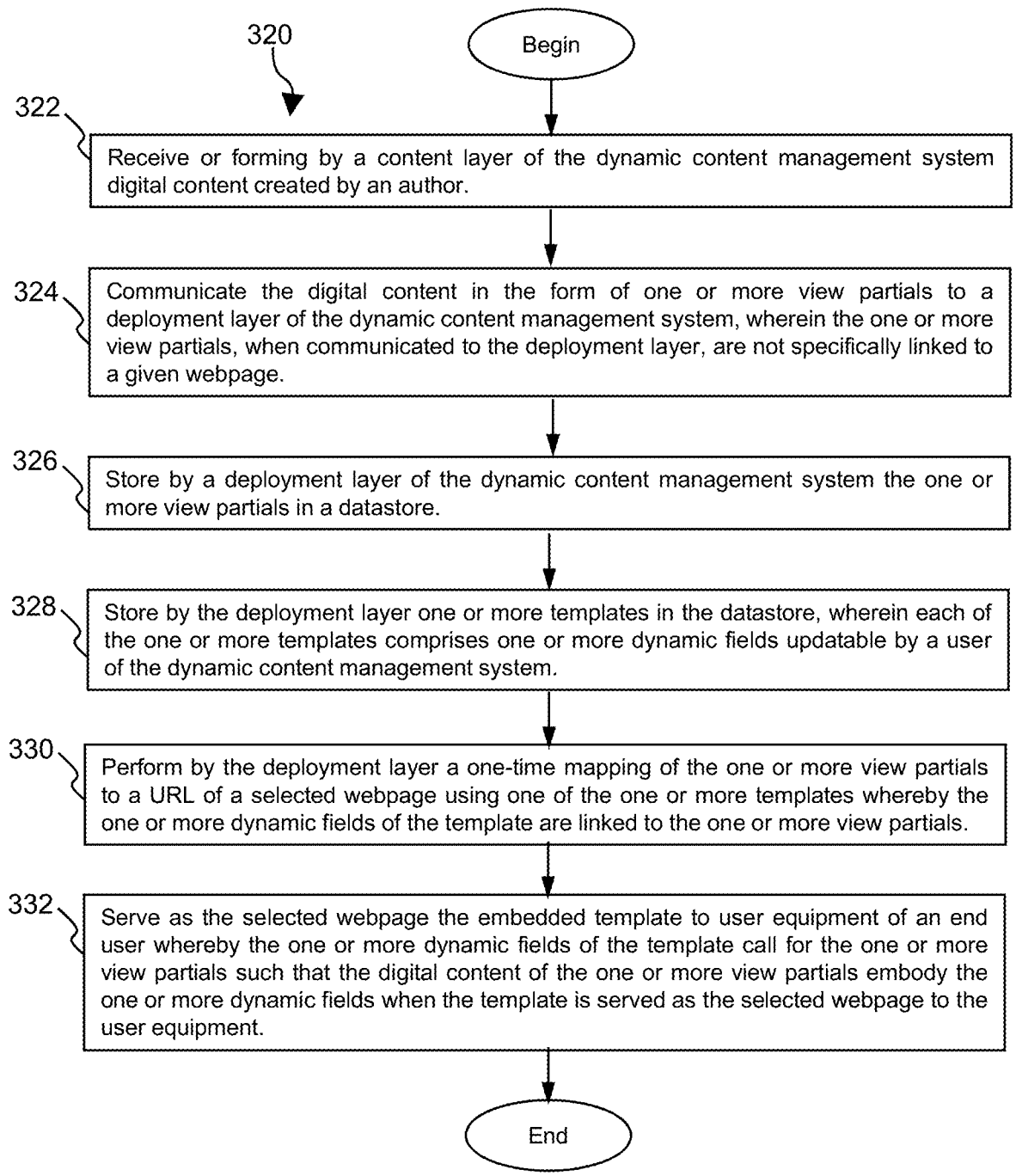
FIG. 4 is a flow chart of another method for managing and deploying digital content using a dynamic content management system according to an embodiment of the disclosure.

Turning to FIG. 4, a method 320 is described. In an embodiment, the method 320 is a method for managing and deploying digital content using a dynamic content management system (e.g., dynamic content management systems 140 and 200 illustrated in FIGS. 1 and 2, respectively). At block 322, method 320 comprises receiving or forming by a content layer (e.g., content layers 142 and 210 illustrated in FIGS. 1 and 2, respectively) of the dynamic content management system digital content created by an author (e.g., author 213 illustrated in FIG. 2).

At block 324, method 320 comprises communicating the digital content in the form of one or more view partials (e.g., view partials 128 and 211 illustrated in FIGS. 1 and 2, respectively) to a deployment layer (e.g., deployment layers 144 and 230 illustrated in FIGS. 1 and 2, respectively) of the dynamic content management system, wherein the one or more view partials, when communicated to the deployment layer, are not specifically linked to a given webpage. At block 326, method 320 comprises storing by the deployment layer the one or more view partials in a datastore (e.g., a datastore of the template rendering engine 236 illustrated in FIG. 2). At block 328, method 320 comprises storing by the deployment layer one or more templates (e.g., dynamic templates 129) in the datastore, wherein each of the one or more templates comprises one or more dynamic fields updatable by a user of the dynamic content management system.

At block 330, method 320 comprises performing by the deployment layer a one-time mapping of the one or more view partials to a URL of a selected webpage using one of the one or more templates whereby the one or more dynamic fields of the template are linked to the one or more view partials. At block 332, method 320 comprises serving as the selected webpage the embedded template to user equipment of an end user whereby the one or more dynamic fields of the template call for the one or more view partials such that the digital content of the one or more view partials embody the one or more dynamic fields when the template is served as the selected webpage to the user equipment.

Figure 5:
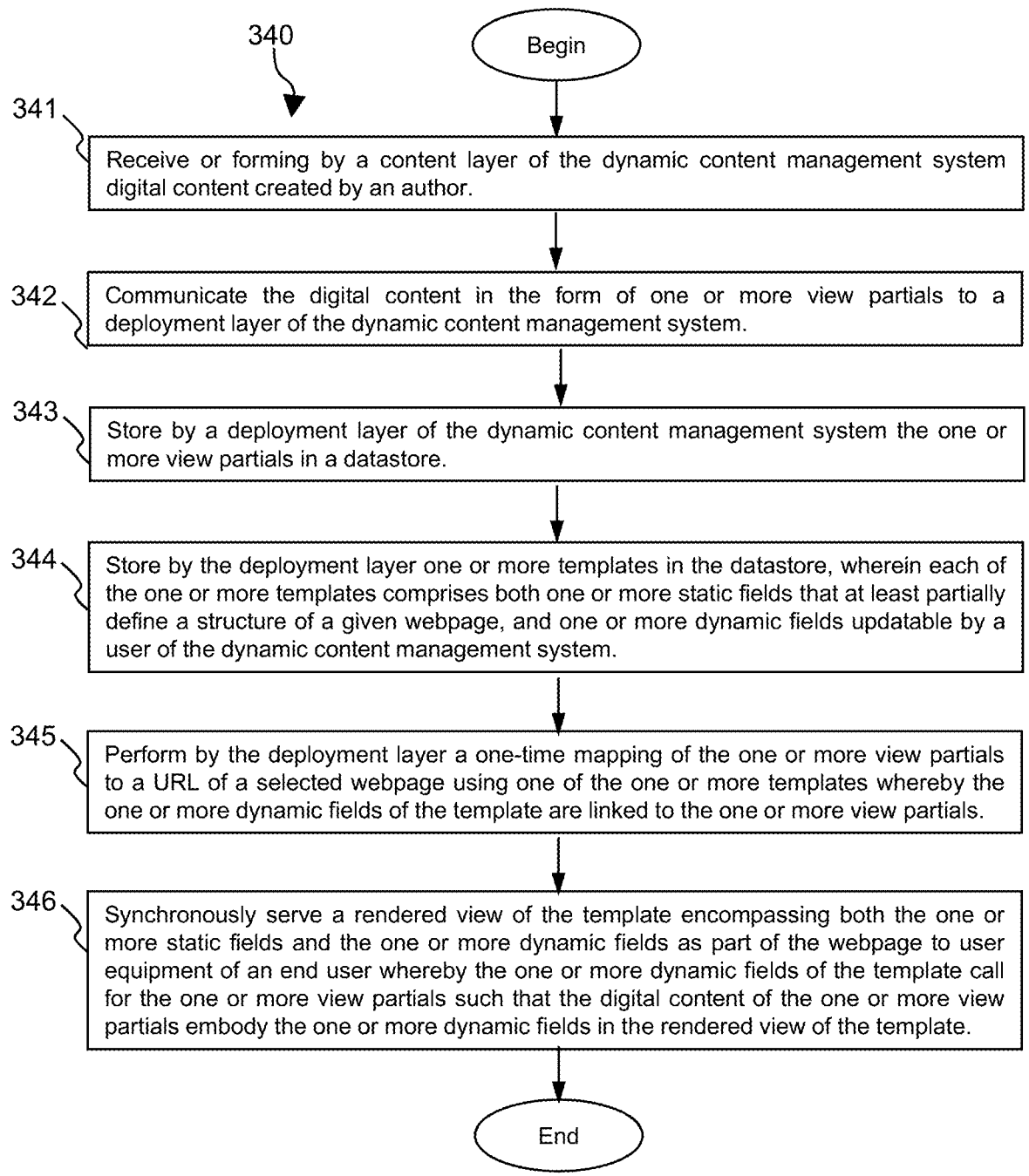
FIG. 5 is a flow chart of another method for managing and deploying digital content using a dynamic content management system according to an embodiment of the disclosure.

Turning to FIG. 5, a method 340 is described. In an embodiment, the method 340 is a method for managing and deploying digital content using a dynamic content management system (e.g., dynamic content management systems 140 and 200 illustrated in FIGS. 1 and 2, respectively). At block 341, method 340 comprises receiving or forming by a content layer (e.g., content layers 142 and 210 illustrated in FIGS. 1 and 2, respectively) of the dynamic content management system digital content created by an author (e.g., author 213 illustrated in FIG. 2).

At block 342, method 340 comprises communicating the digital content in the form of one or more view partials (e.g., view partials 128 and 211 illustrated in FIGS. 1 and 2, respectively) to a deployment layer (e.g., deployment layers 144 and 230 illustrated in FIGS. 1 and 2, respectively) of the dynamic content management system. At block 343, method 340 comprises storing by the deployment layer the one or more view partials in a datastore (e.g., a datastore of the template rendering engine 236 illustrated in FIG. 2).

At block 344, method 340 comprises storing by the deployment layer one or more templates (e.g., dynamic templates 129) in the datastore, wherein each of the one or more templates comprises both one or more static fields that at least partially define a structure of a given webpage, and one or more dynamic fields updatable by a user of the dynamic content management system. At block 345, method 340 comprises performing by the deployment layer a one-time mapping of the one or more view partials to a URL of a selected webpage using one of the one or more templates whereby the one or more dynamic fields of the template are linked to the one or more view partials. At block 346, method 340 comprises synchronously serving a rendered view of the template encompassing both the one or more static fields and the one or more dynamic fields as part of the webpage to user equipment of an end user whereby the one or more dynamic fields of the template call for the one or more view partials such that the digital content of the one or more view partials embody the one or more dynamic fields in the rendered view of the template.

Figure 6A:
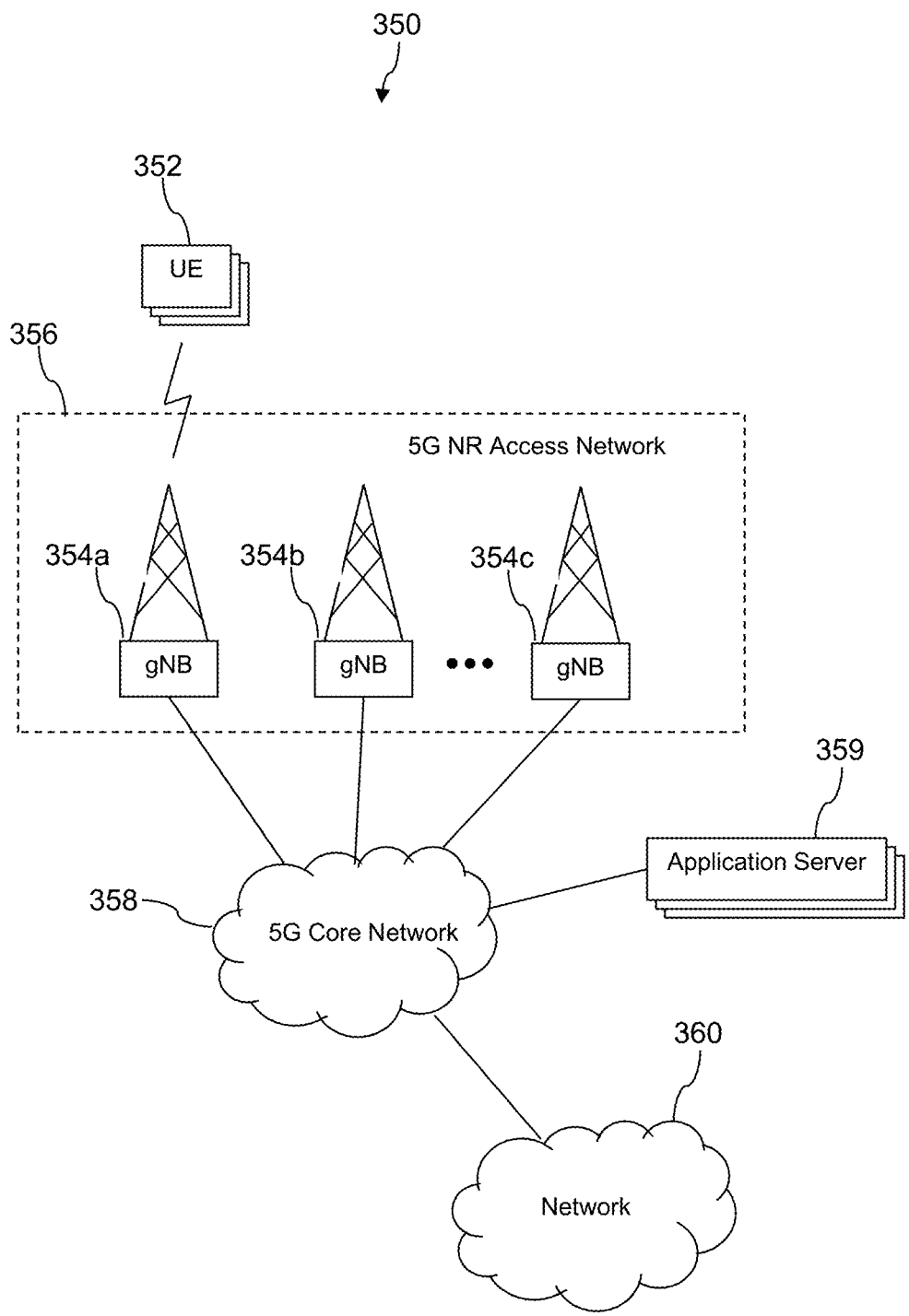
FIG. 6A is a block diagram of another communication system according to an embodiment of the disclosure.

Turning now to FIG. 6A, an exemplary communication system 350 is described. Typically, the communication system 350 includes a number of access nodes 354 that are configured to provide coverage in which UEs 352 such as cell phones, tablet computers, machine-type-communication devices, tracking devices, embedded wireless modules, and/or other wirelessly equipped communication devices (whether or not user operated), can operate. The access nodes 354 may be said to establish an access network 356. The access network 356 may be referred to as a radio access network (RAN) in some contexts.

In a 5G technology generation an access node 354 may be referred to as a next Generation Node B (gNB). In 4G technology (e.g., long term evolution (LTE) technology) an access node 354 may be referred to as an evolved Node B (eNB). In 3G technology (e.g., code division multiple access (CDMA) and global system for mobile communication (GSM)) an access node 354 may be referred to as a base transceiver station (BTS) combined with a base station controller (BSC). In some contexts, the access node 354 may be referred to as a cell site or a cell tower. In some implementations, a picocell may provide some of the functionality of an access node 354, albeit with a constrained coverage area. Each of these different embodiments of an access node 354 may be considered to provide roughly similar functions in the different technology generations.

In an embodiment, the access network 356 comprises a first access node 354a, a second access node 354b, and a third access node 354c. It is understood that the access network 356 may include any number of access nodes 354. Further, each access node 354 could be coupled with a core network 358 that provides connectivity with various application servers 359 and/or a network 360. In an embodiment, at least some of the application servers 359 may be located close to the network edge (e.g., geographically close to the UE 352 and the end user) to deliver so-called "edge computing." The network 360 may be one or more private networks, one or more public networks, or a combination thereof. The network 360 may comprise the public switched telephone network (PSTN). The network 360 may comprise the Internet. With this arrangement, a UE 352 within coverage of the access network 356 could engage in air-interface communication with an access node 354 and could thereby communicate via the access node 354 with various application servers and other entities.

The communication system 350 could operate in accordance with a particular radio access technology (RAT), with communications from an access node 354 to UEs 352 defining a downlink or forward link and communications from the UEs 352 to the access node 354 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 354 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 354 could define an air interface configured in a specific manner to define physical resources for carrying information wirelessly between the access node 354 and UEs 352.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 352.

In addition, certain resource elements on the example air interface could be reserved for special purposes. For instance, on the downlink, certain resource elements could be reserved to carry synchronization signals that UEs 352 could detect as an indication of the presence of coverage and to establish frame timing, other resource elements could be reserved to carry a reference signal that UEs 352 could measure in order to determine coverage strength, and still other resource elements could be reserved to carry other control signaling such as PRB-scheduling directives and acknowledgement messaging from the access node 354 to served UEs 352. And on the uplink, certain resource elements could be reserved to carry random access signaling from UEs 352 to the access node 354, and other resource elements could be reserved to carry other control signaling such as PRB-scheduling requests and acknowledgement signaling from UEs 352 to the access node 354

The access node 354, in some instances, may be split functionally into a radio unit (RU), a distributed unit (DU), and a central unit (CU) where each of the RU, DU, and CU have distinctive roles to play in the access network 356. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
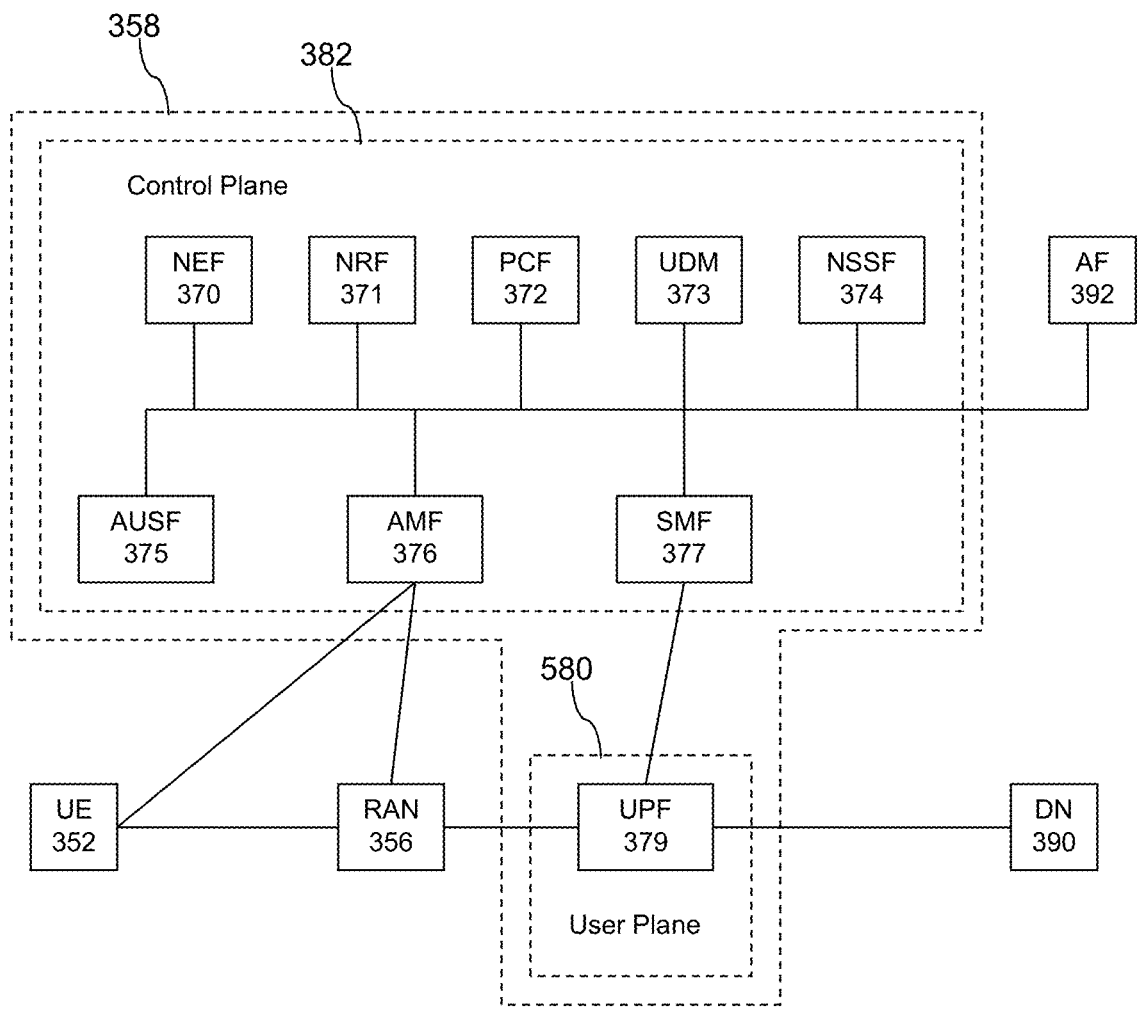
FIG. 6B is a block diagram of a core network of the communication system of FIG. 6A according to an embodiment of the disclosure.

Turning now to FIG. 6B, further details of the core network 358 are described. In an embodiment, the core network 358 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 379, an authentication server function (AUSF) 375, an access and mobility management function (AMF) 376, a SMF 377, a network exposure function (NEF) 370, a network repository function (NRF) 371, a policy control function (PCF) 372, a UDM 373, a network slice selection function (NSSF) 374, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 358 may be segregated into a user plane 380 and a control plane 382, thereby promoting independent scalability, evolution, and flexible deployment.

The UPF 379 delivers packet processing and links the UE 352, via the access network 356, to a data network 390 (e.g., the network 360 illustrated in FIG. 6A). The AMF 376 handles registration and connection management of non-access stratum (NAS) signaling with the UE 352. Said in other words, the AMF 376 manages UE registration and mobility issues. The AMF 376 manages reachability of the UEs 352 as well as various security issues. The SMF 377 handles session management issues. Specifically, the SMF 377 creates, updates, and removes (destroys) PDU sessions and manages the session context within the UPF 379. The SMF 377 decouples other control plane functions from user plane functions by performing dynamic host configuration protocol (DHCP) functions and IP address management functions. The AUSF 375 facilitates security processes.

The NEF 370 securely exposes the services and capabilities provided by network functions. The NRF 371 supports service registration by network functions and discovery of network functions by other network functions. The PCF 372 supports policy control decisions and flow based charging control. The UDM 373 manages network user data and can be paired with a user data repository (UDR) that stores user data such as customer profile information, customer authentication number, and encryption keys for the information. An application function 392, which may be located outside of the core network 358, exposes the application layer for interacting with the core network 358. In an embodiment, the application function 392 may be execute on an application server 359 located geographically proximate to the UE 352 in an "edge computing" deployment mode. The core network 358 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 374 can help the AMF 376 to select the network slice instance (NSI) for use with the UE 352.

Figure 7:
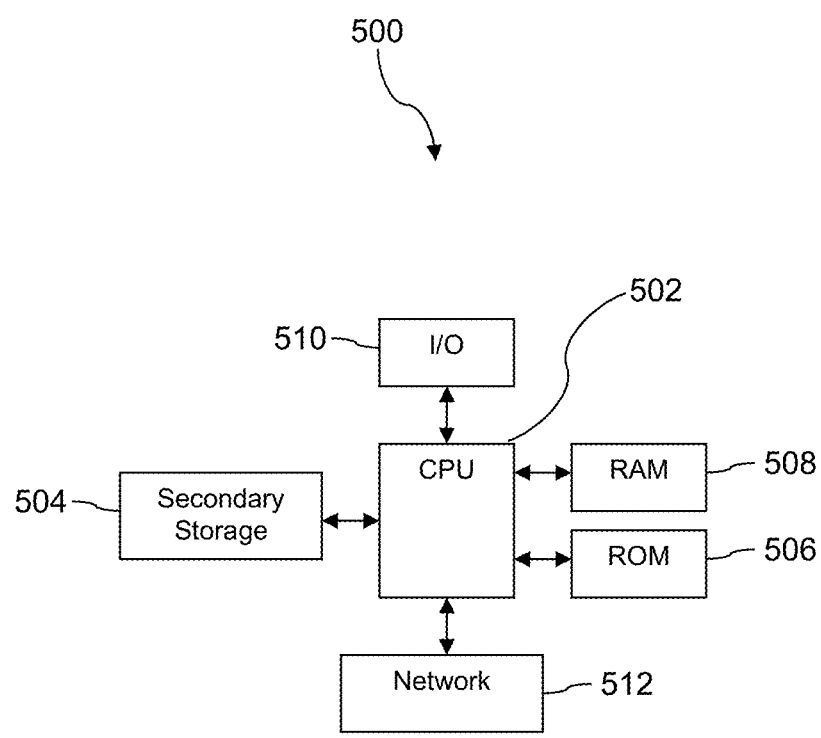
FIG. 7 is a block diagram of a computer system according to an embodiment of the disclosure.

FIG. 7 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk-based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing and deploying digital content using a dynamic content management system executing on a computer system, the method comprising:
   receiving or forming by a content layer of the dynamic content management system digital content created by an author;
   communicating the digital content in the form of one or more view partials to a deployment layer of the dynamic content management system;
   storing by the deployment layer the one or more view partials in a datastore;
   performing by the deployment layer a one-time mapping of the one or more view partials to a uniform resource locator (URL) of a webpage using a template of the deployment layer associated with the webpage and that identifies one or more components of a tech stack supporting the webpage that facilitate the deploying the template as the webpage;
   embedding by the deployment layer the one or more view partials into the template whereby the template structures a presentation of the one or more view partials; and
   serving in the form of the webpage the embedded template to user equipment of an end user.

2. The method of claim 1, further comprising:
   producing the one or more view partials from the digital content using a partial rendering engine of the content layer.

3. The method of claim 1, further comprising:
   generating a visual preview of the webpage including the digital content using a preview system of the content layer.

4. The method of claim 1, further comprising:
   creating the template by a template rendering engine of the deployment layer whereby the template is provided with one or more static fields and one or more dynamic fields.

5. The method of claim 4, wherein the one or more static fields apply underlying structure to the template, and the one or more dynamic fields are embeddable with the one or more view partials.

6. The method of claim 4, further comprising:
   storing the template in the template rendering engine of the deployment layer.

7. The method of claim 1, wherein the deployment layer is connected to the tech stack through a backend connector defining a plurality of separate scenarios associated with the webpage.

8. A method for managing and deploying digital content using a dynamic content management system executing on a computer system, the method comprising:
   receiving or forming by a content layer of the dynamic content management system digital content created by an author;
   communicating the digital content in the form of one or more view partials to a deployment layer of the dynamic content management system, wherein the one or more view partials, when communicated to the deployment layer, are not specifically linked to a given webpage;
   storing by the deployment layer the one or more view partials in a datastore;
   storing by the deployment layer one or more templates in the datastore, wherein each of the one or more templates comprises one or more dynamic fields updatable by a user of the dynamic content management system;
   performing by the deployment layer a one-time mapping of the one or more view partials to a uniform resource locator (URL) of a selected webpage using one of the one or more templates whereby the one or more dynamic fields of the template are linked to the one or more view partials; and
   serving as the selected webpage the embedded template to user equipment of an end user whereby the one or more dynamic fields of the template call for the one or more view partials such that the digital content of the one or more view partials embody the one or more dynamic fields when the template is served as the selected webpage to the user equipment.

9. The method of claim 8, further comprising:
   configuring a backend connector connecting the deployment layer with a tech stack supporting the webpage whereby the backend connector defines a plurality of separate scenarios associated with the webpage.

10. The method of claim 9, wherein each of the scenarios is mapped to a unique set of resources of the tech stack.

11. The method of claim 10, wherein the unique set of resources comprises services or products of the tech stack.

12. The method of claim 8, further comprising:
    approving by an approver using a content manager of the content layer the digital content for publishing by the content layer as the one or more view partials.

13. The method of claim 8, further comprising:
    modifying one or more components of a tech stack supporting the webpage without correspondingly modifying a partial rendering engine of the content layer responsible for publishing the digital content as the one or more view partials.

14. The method of claim 8, further comprising:
    generating a visual preview of the webpage including the digital content using a preview system of the content layer.

15. A method for managing and deploying digital content using a dynamic content management system executing on a computer system, the method comprising:
    receiving or forming by a content layer of the dynamic content management system digital content created by an author;
    communicating the digital content in the form of one or more view partials to a deployment layer of the dynamic content management system;

storing by the deployment layer the one or more view partials in a datastore;

storing by the deployment layer one or more templates in the datastore, wherein each of the one or more templates comprises both one or more static fields that at least partially define a structure of a given webpage, and one or more dynamic fields updatable by a user of the dynamic content management system;

performing by the deployment layer a one-time mapping of the one or more view partials to a uniform resource locator (URL) of a selected webpage using one of the one or more templates whereby the one or more dynamic fields of the template are linked to the one or more view partials; and synchronously serving a rendered view of the template encompassing both the one or more static fields and the one or more dynamic fields as part of the webpage to user equipment of an end user whereby the one or more dynamic fields of the template call for the one or more view partials such that the digital content of the one or more view partials embody the one or more dynamic fields in the rendered view of the template.

16. The method of claim 15, further comprising:
modifying one or more components of a tech stack supporting the webpage without correspondingly modifying a partial rendering engine of the content layer responsible for publishing the digital content as the one or more view partials.

17. The method of claim 15, further comprising:
returning one or more services of a tech stack supporting the webpage to the deployment layer using a return connector connected between the deployment layer and the tech stack.

18. The method of claim 15, further comprising:
configuring a backend connector connecting the deployment layer with a tech stack supporting the webpage whereby the backend connector defines a plurality of separate scenarios associated with the webpage.

19. The method of claim 18, wherein each of the scenarios is mapped to a unique set of resources of the tech stack.

20. The method of claim 15, further comprising:
creating the template by a template rendering engine of the deployment layer whereby the template is provided with one or more static fields and one or more dynamic fields.

* * * * *